July 11, 1944.  B. BURNHAM ET AL  2,353,218
PHOTOGRAPHIC PRINTING APPARATUS
Filed March 14, 1941
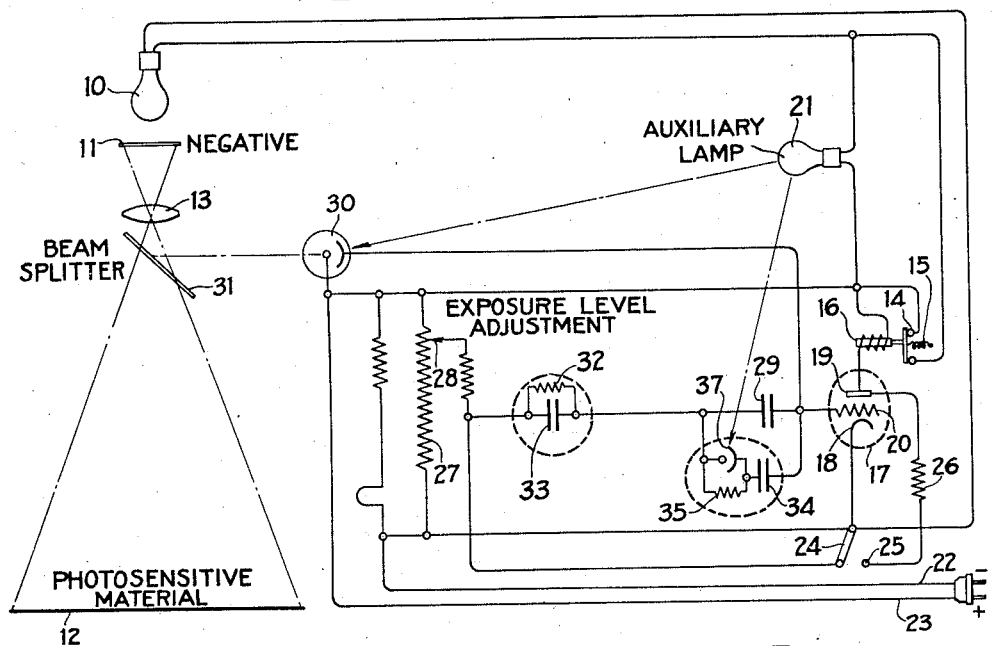
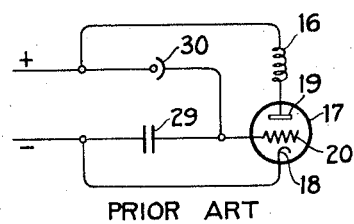
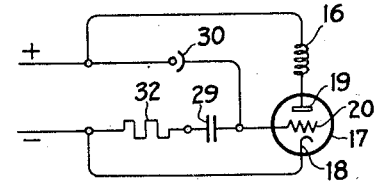
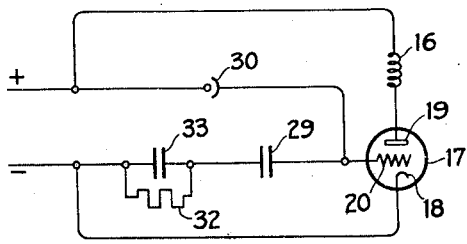
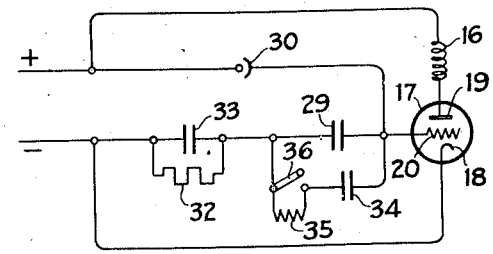
BRADSHAW BURNHAM
EBEN HOAG
*INVENTORS*
BY
*ATTORNEYS*

Patented July 11, 1944

2,353,218

UNITED STATES PATENT OFFICE 2,353,218

PHOTOGRAPHIC PRINTING APPARATUS

Bradshaw Burnham and Eben Hoag, Rochester, N. Y., assignors to Eastman Kodak Company, Rochester, N. Y., a corporation of New Jersey Application March 14, 1941, Serial No. 383,376

6 Claims. (Cl. 88—24)

The present invention relates to apparatus adapted to respond to electric current or potential and, more particularly, to apparatus which is adapted to provide a time interval dependent upon the magnitude of a condition or the controlling characteristic of a medium being processed.

More specifically, the invention relates to apparatus for controlling automatically the exposure given a sensitive photographic layer.

In exposing photographic layers to light of different average intensities it is generally desirable to give each layer a constant exposure so that, upon being developed, a record of substantially constant density will be produced. However, due to failure of the reciprocity law, it is known to be desirable to increase long exposures so that the quantum of exposure light progressively increases as the average intensity of the exposure decreases.

In photographic printing, especially where the exposure is given by the turning on and off of an incandescent lamp, it has been found that when the lamp switch is turned off at the proper time for correct exposure the actual exposure will be more than is necessary and the shorter the exposure interval the greater will be the over exposure so that when very thin negatives are printed the over exposure will render the prints unsatisfactory.

It is an object of the present invention to provide a printing apparatus which will automatically increase the quantum of printing light as the average transmission of the record being printed decreases. Another object of the invention is to provide an automatic printer in which short exposures given thin negatives are appreciably shortened so as to take into account and to compensate for the exposing light radiated by the printing lamp after it has been turned off.

In carrying the invention into effect the exposure timing mechanism is made responsive to the average transmission of the record to be printed and is provided with a pre-trip device or afterglow anticipator which is effective only when the exposures are very short. The timing mechanism is also provided with an exposure lengthening arrangement which becomes effective only when relatively long exposures are involved.

In the specific embodiment of the invention about to be described the variation of the charge on a condenser, in accordance with the printing light employed for timing the exposure, is modified or caused to function in a manner to effect progressively shorter and longer exposures, respectively.

The novel features believed to be characteristic of the invention are set forth with particularity in the appended claims. The invention itself, both as to its organization and method of operation, will best be understood from the following description when read in connection with the accompanying drawing in which:

Fig. 1 shows diagrammatically a printer having an automatic exposure control arrangement incorporating the preferred embodiment of the invention;

Fig. 2 is a fragmentary showing of a prior art circuit;

Figs. 3 and 4 are fragmentary diagrams of two forms of afterglow anticipating circuits; and, Fig. 5 is a fragmentary diagram of a modification of the arrangement shown in Fig. 1.

The basic exposure control circuit arrangement in which the invention is incorporated for the purpose of illustration is one adapted for use with a direct current supply and its design follows closely the systems described and claimed in Merriman and Burnham application Serial No. 309,222, filed December 14, 1939, Patent No. 2,258,994.

Referring to the drawing there is shown diagrammatically in Fig. 1 a printer comprising a lamp 10 positioned to illuminate a record 11 to be printed, which record is imaged on photographic material 12 by a suitable lens 13. The starting and stopping of an exposure interval may be obtained in any suitable manner and is here shown as being controlled by a switch 14 which is biased to circuit closing position by a spring 15 and is adapted to be held in open circuit position by a relay coil 16 whenever the coil 16 is energized. This coil 16 is included in the plate circuit of a suitable electronic tube 17 shown as having a cathode 18, an anode 19 and a control electrode or grid 20. Thus, whenever plate current is flowing through the tube 17, the relay 16 is energized and the lamp 10 is dark. For the reasons appearing hereinafter, it is preferred to include an auxiliary lamp 21 in series with the lamp 10 and so selected that the current therethrough will cause the lamp 21 to emit light but is not sufficient to cause the lamp 10 to glow. The switch 14, when closed, shunts the lamp 21 and full voltage is applied to lamp 10 which brings it to incandescence.

With the power leads 22 and 23 connected to any suitable source of direct current a printing control switch 24 which may be controlled by the platen (not shown) will be in engagement with a contact 25 which may connect a resistance 26 between the cathode 18 and the anode 19 to insure the existence of plate current for energizing the relay 16 to hold the switch 14 open.

With the switch 24 in engagement with the contact 25 a potentiometer 27 having an adjustable contact 28 supplies the grid 20 of the tube 17 with a potential corresponding to the exposure level desired. With this potential on the grid 20 the grid current will charge a condenser 29 which has included in its discharge path a light-sensitive cell 30 arranged to receive a predetermined portion of the light transmitted by the record 11 by means of a transparent mirror 31.

This basic control circuit is shown in simplified form in Fig. 2 and is well known. It functions to control the exposure interval in the following manner. A predetermined charge is maintained on the condenser 29 so that when the switch 24 is moved to the position shown in Fig. 1 to start a printing interval, this movement of the switch 24 removes the charging potential from the condenser 29 which causes the grid 20 to become sufficiently negative to stop the flow of plate current through the tube 17 which deenergizes the relay coil 16 and permits the spring 15 to close the switch 14, thereby energizing the lamp 10. When the lamp 10 is energized to start an exposure, a portion of the light is directed onto the cell 30 by the mirror 31 to cause it to assume a resistance corresponding to the transmission of the record 11. The condenser 29 commences to discharge through the cell 30 and at a rate dependent upon the resistance of the cell 30 until the charge on the condenser 29 has been reduced to a value such that the potential of the grid 20 no longer prevents the flow of plate current through the tube 17. When this plate current again starts to flow, the relay 16 is actuated to darken the lamp 10 to discontinue the exposure.

When the lamp 10 is deenergized, as above described, it continues to emit light for an appreciable time while it is cooling off and when very short exposures are involved, i. e., when printing very thin negatives, this afterglow of the lamp 10 causes the print to be overexposed. In accordance with one feature of the invention, the control circuit is designed to anticipate this afterglow and to bring about a progressive shortening of short exposures.

As shown in Fig. 3, this desired shortening of short exposures may be brought about by including in series with the control condenser 29 a resistance 32 so that it is the voltage across this series combination which is impressed between the cathode 18 and the grid 20 of the tube 17. This arrangement functions to shorten short exposures for the reason that the thinner the record 11, the smaller is the resistance of the cell 30 and, therefore, the current discharging the condenser 29 is larger. With a relatively large discharging current flowing through the series resistance 32, its IR drop will be appreciable and, since the tube 17 is sensitive to the voltage across the condenser 29 plus this IR drop, it follows that the switch 14 will be opened to stop an exposure before the condenser 29 has reached the condition predetermined to give the desired exposure level for records of average transmission. When records of average transmission are printed, the resistance of cell 30 is relatively high and the discharge current for the condenser 29 is correspondingly low so that the IR drop across the resistance 32 is negligible.

The control circuit just described is prone to be unstable, but this difficulty may be satisfactorily overcome by shunting the resistance 32 with an auxiliary condenser 33 as shown in Fig. 4. With this arrangement large discharging currents accompanying short exposures discharge the condensers 29 and 33 so rapidly that the resistance 32 does not appreciably affect the condenser series connection and an exposure results approaching that which would occur if a single condenser were used having a capacity equal to the series capacity of the two series connected condensers 29 and 33. For smaller values of current involved in longer exposures the resistance 32 renders the auxiliary condenser 33 decreasingly effective and exposures result approaching that which would occur if the main exposure control condenser 29 were used alone.

As is well known, the exposure level, which produces satisfactory prints from average negatives, will result in under-exposed prints when very dense negatives are printed. In order to progressively increase the duration of long exposures, the control condenser 29 is, according to the invention, and as shown in Fig. 5, shunted by a condenser 34 and a resistance 35 in series. The capacity of the condenser 34 and the magnitude of the resistance 35 are such that, for short exposures, the condenser 34 does not appreciably affect the exposure interval, while, for longer exposures, the condenser 34 becomes increasingly effective, thereby securing a greater current-time product which, for very small values of current through the cell 30, approaches that of the two condensers 29 and 34 in parallel. During the periods between exposures the resistance 35 may be shorted by a switch 36 to eliminate any delay in the condenser 34 being fully charged. This switch 36 may be operatively coupled to the platen or may comprise a photocell 37 as shown in Fig. 1 arranged to receive light from the auxiliary lamp 21. As was pointed out above, this lamp 21 is energized only during the time a printing exposure is not taking place.

The preferred embodiment of the invention, as shown in both Figs. 1 and 5, incorporates in its control circuit both the arrangement for shortening short exposures and the arrangement for lengthening relatively long exposures, so that at each end of the exposure time scale the control circuit provides a printing interval which is a variable function of the intensity of the exposure.

While the invention has been described in connection with a specific embodiment, it will be obvious to those skilled in the art that the invention may be practiced in various other ways without departing from the spirit of the invention, the scope of which is pointed out in the appended claims.

We claim:

1. In a photographic printer in which means responsive to a predetermined voltage across a condenser terminates a printing exposure, means providing a discharge path for the condenser and having a resistance corresponding to the average transmission of the record being printed, means for starting an exposure with a predetermined voltage across the condenser, and means connected in shunt relation with the condenser for decreasing the rate of discharge of the condenser faster than the resistance of the discharge path increases.

2. The apparatus claimed in claim 1 wherein the condenser shunting means comprises a condenser and a resistance in series.

3. In apparatus for the automatic control of exposure in photographic printing in which a photocell varies the charge on a condenser in dependence on the quantum of the printing light, voltage responsive means operable to terminate a printing interval when subjected to a predetermined voltage, a resistance in series with the condenser whose charge is varied, a circuit for impressing upon the voltage responsive means the voltage across the condenser and its series resistance, whereby when the condenser charge is varied at a rapid rate the exposure controlling voltage is noticeably augmented by the IR drop across the resistance, said IR drop becoming decreasingly effective as the rate the condenser charge is varied decreases.

4. In photographic printing apparatus in which the exposure is automatically controlled, a condenser, means for varying the charge on the condenser as a function of the average transmission of the record being printed, whereby the voltage across the condenser is varied, voltage responsive means for terminating the printing interval when subjected to a predetermined voltage, and means for impressing said predetermined voltage upon said voltage responsive means when the voltage across the condenser differs from said predetermined voltage by an amount which is a function of the rate the condenser charge is varied, said voltage impressing means comprising at least one impedance arranged in series with and at least one separate impedance arranged in shunt with said condenser.

5. A system for providing time intervals corresponding to the magnitude of a condition, comprising a control means responsive to a predetermined voltage across its terminals for terminating a time interval, means for impressing a standard voltage across said terminals, a circuit including a condenser and an associated impedance connected across said terminals, means for initiating a time interval, means operative upon the initiation of the time interval for causing to flow through said circuit a current proportional to the magnitude of the condition, whereby the voltage across said terminals is varied, said associated impedance being so proportioned and connected that when the voltage across said terminals reaches said predetermined value the voltage across said condenser differs therefrom as a function of the current flowing through the circuit.

6. In photographic printing apparatus in which the variation of an electric potential through a predetermined range and under the control of a light sensitive cell determines the exposure period, a main condenser and an auxiliary condenser in series with a light sensitive cell, a control circuit responsive to a predetermined potential across the two condensers for timing the exposure, and a resistance connected in shunt relation to the auxiliary condenser, whereby as the resistance of said cell increases from a minimum the effective combined capacity of the two condensers increases from substantially their series capacity to a value approaching the capacity of the main condenser alone.

BRADSHAW BURNHAM.
EBEN HOAG.